(12) United States Patent
Stegmann

(10) Patent No.: US 11,042,517 B2
(45) Date of Patent: Jun. 22, 2021

(54) ONLINE MIGRATION OF DATABASE SYSTEMS

(71) Applicant: SAP SE, Walldorf (DE)

(72) Inventor: Christian Stegmann, Seligenstadt (DE)

(73) Assignee: SAP SE, Walldorf (DE)

( * ) Notice: Subject to any disclaimer, the term of this patent is extended or adjusted under 35 U.S.C. 154(b) by 145 days.

(21) Appl. No.: 16/434,268

(22) Filed: Jun. 7, 2019

(65) Prior Publication Data
US 2020/0387514 A1    Dec. 10, 2020

(51) Int. Cl.
*G06F 16/21* (2019.01)
*G06F 16/2455* (2019.01)
*G06F 16/23* (2019.01)
*G06F 11/34* (2006.01)

(52) U.S. Cl.
CPC ........ *G06F 16/214* (2019.01); *G06F 11/3419* (2013.01); *G06F 16/217* (2019.01); *G06F 16/2343* (2019.01); *G06F 16/2379* (2019.01); *G06F 16/2393* (2019.01); *G06F 16/24565* (2019.01)

(58) Field of Classification Search
CPC ..................................................... G06F 16/214
See application file for complete search history.

(56) References Cited

U.S. PATENT DOCUMENTS

| | | | |
|---|---|---|---|
| 8,521,706 B2 | 8/2013 | Alpern et al. | |
| 9,213,728 B2 | 12/2015 | Engelko et al. | |
| 9,519,675 B2 | 12/2016 | Specht et al. | |
| 2003/0177146 A1* | 9/2003 | Zimowski | G06F 16/214 |
| 2015/0006490 A1* | 1/2015 | Balasubramanian | G06F 16/2365 707/690 |
| 2015/0026127 A1 | 1/2015 | Zachrisen et al. | |
| 2015/0142728 A1 | 5/2015 | Nigam et al. | |

(Continued)

FOREIGN PATENT DOCUMENTS

| | | | | |
|---|---|---|---|---|
| JP | 2016-099709 A | 5/2016 | | |
| WO | WQ-02084522 A2 * | 10/2002 | | G06F 16/254 |

OTHER PUBLICATIONS

Kirk, How to Run Zero-Downtime Migrations on an RDBMS (Like MySQL), Apr. 26, 2018 (accessed Dec. 25, 2020 at https://www.matthewkirk.com/news/2018/4/26/how-to-run-zero-downtime-migrations-on-an-rdbms-like-mysql) (Year: 2018).*

(Continued)

*Primary Examiner* — William Spieler
(74) *Attorney, Agent, or Firm* — Sterne, Kessler, Goldstein & Fox P.L.L.C.

(57) ABSTRACT

Disclosed herein are system, method, and computer program product embodiments for performing a database migration with reduced downtime. Embodiments provide for migrating a source database table at a source database system to a target database table at a target database system. The embodiments provide for configuring the source database system to log changes to the source database table to a log, wherein the log is configured to replay the changes to the target database table and creating a replacement view table at the target database system, wherein the replacement view table provides access to current data from the source database table and the target database table. This approach allows access to the current data as replication continues without the need to take down access to the database.

20 Claims, 6 Drawing Sheets

(56) References Cited

U.S. PATENT DOCUMENTS

| | | | |
|---|---|---|---|
| 2016/0203050 A1* | 7/2016 | Hrle ................... | G06F 11/1402 |
| | | | 707/625 |
| 2017/0031780 A1* | 2/2017 | Biewald .............. | G06F 11/0751 |
| 2019/0258614 A1* | 8/2019 | Daniels ............... | G06F 11/1451 |

OTHER PUBLICATIONS

Romanovski, How to Migrate High-Load Tables With Zero Downtime Using Background Jobs and SQL Views, Jun. 20, 2017 (accessed Dec. 25, 2020 at https://www.elinext.com/blog/how-to-migrate-high-load-tables-with-zero-downtime-using-background-jobs-and-sql-views/) (Year: 2017).*

* cited by examiner

US 11,042,517 B2

ONLINE MIGRATION OF DATABASE SYSTEMS

BACKGROUND

Database administrators occasionally need to migrate an online database from one database system to another. Often, both the source database system and the target database system are disabled from online access during this migration in order to avoid data access errors that can occur from an access attempt made in the middle of the migration. These errors may include, for example, an inability to determine whether data is current or stale, computation based on stale data, or committing invalid data to the database. And there is likely no way at all to continue responding to queries during migration.

While disabling access to the source and target database systems is a safe and effective way to ensure complete and accurate migration of the online database, this is not always practical. Many production systems require continuous uptime, and disabling access to such systems can result in lost productivity, lost revenue, or loss of access to time-sensitive information. Accordingly, it is desirable to devise online migration mechanisms that reduce or eliminate the amount of downtime in the process.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for reducing or eliminating the amount of downtime in online access to a database system during migration.

Databases occasionally need to be migrated from one database system to another. This may be necessary for a number of reasons, such as migrating to a database system that provides additional functionality or performance improvements, migrating to a database system provided by a different database vendor (heterogeneous migration), or when support for the current database system reaches end of life. Increasingly common is migration to move a database located on an on-premise database system to a cloud based database system.

Regardless of the reason for needing to migrate the database, a database system administrator performing the migration is presented with the task of performing the migration in a way that guarantees the safety and correctness of the information once it is moved from a source database system to a target database system, and often while reducing the amount of downtime users face in accessing data from the database.

Figure 1:
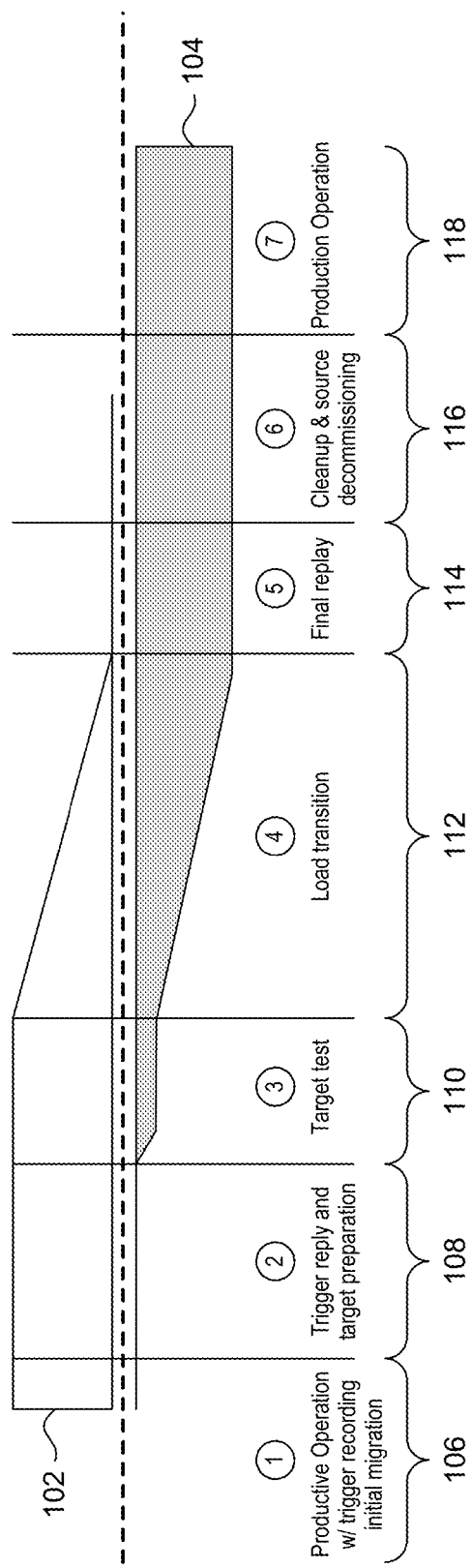
FIG. 1 is a load diagram illustrating an exemplary staged migration, in accordance with an embodiment.

In an embodiment, a database may be migrated from a source database to a target database in stages. FIG. 1 is a load diagram 100 illustrating an exemplary staged migration, in accordance with an embodiment. As shown in load diagram 100, a database located at a source database system 102 is being migrated to a target database system 104. The thickness of the bars shown to the right of source database system 102 and to the left of target database system 104 show how access requests to the database are distributed between the source 102 and target 104 database systems, in accordance with an embodiment, and reflect the load placed on each by responding to these requests.

At step 106, all requests for access to the database are routed to (and responded by) source database system 102, triggers used for replication are created, and the database from source database system 102 is initially copied to target database system 104. At step 108, the target database system 104 is prepared, such as by renaming tables and setting up a replacement view on the target database system 104, as described in further detail below. At this point, in accordance with an embodiment, the triggers created at step 106 and the tables and view created at step 108 ensure the accuracy of reads and writes across both the source 102 and target 104 database systems.

At step 110, the correctness of replayed data, as well as data fetched remotely from the source database system, is tested at the target database system 104.

At step 112, once the correctness of the replication triggers and the initial migration of the database has been confirmed, the load is gradually transitioned from source database system 102 to target database system 104. At step 114, all requests are being directed to the database hosted at target database system 104 except for requests to a select few items that have not yet been replicated, at which point a final replay takes place. At step 116, any final cleanup takes place and source database system 102 is decommissioned, resulting in target database system 104 becoming the new production system at step 118.

The operation of the triggers, replication, and load handling across the source database system 102 and the target database system 104 is described in further detail with reference to the following diagrams.

Figure 2:
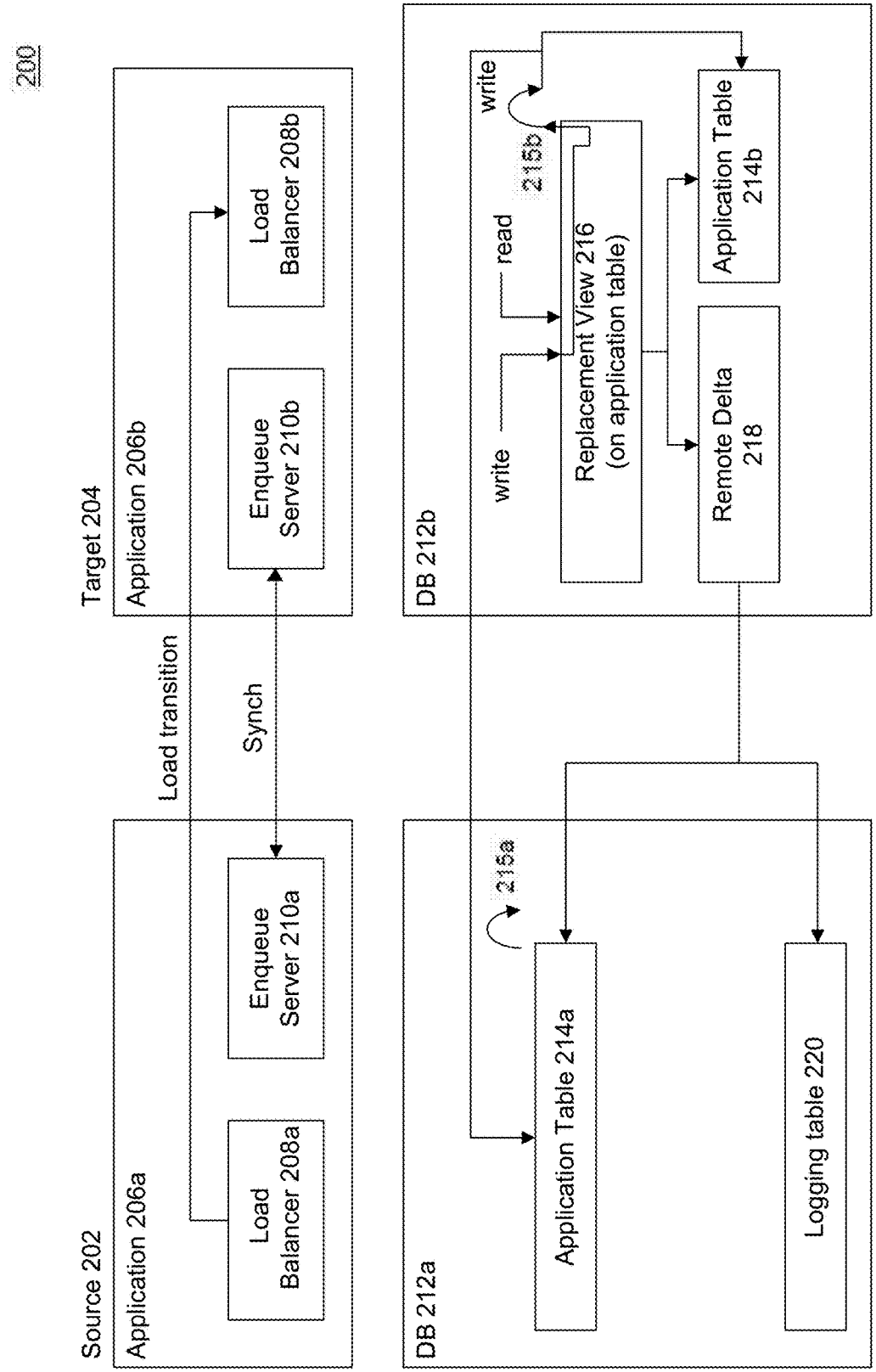
FIG. 2 is a system diagram, in accordance with an embodiment.

FIG. 2 is a system diagram 200, in accordance with an embodiment. The system includes a source database system 202 and a target database system 204. Source database system 202 includes a database 212a, while target database system 204 includes a database 212b. In the examples discussed herein, database 212a (in source database system 202) is being migrated to database 212b (in target database system 204).

Database 212a includes an application table 214a. Application table 214a may be any standard table that is accessed by an application, such as application 206a of the source database system 202 (and corresponding application 206b in the target database system 204).

In accordance with an embodiment, application table 214a is configured with a trigger 215a (shown by the looping arrow) that logs changes to application table 214a to logging table 220, for later replay. This ensures that any changes to application table 214a can be captured and replayed later. With this trigger 215a in place, application table 214a is copied (both the data and structure) to database 212b as application table 214b. With these systems 202 and 204 in place, application table 214a is ready to be migrated to database 212b.

One skilled in the relevant art will recognize that, if nothing has been changed in application table 214a during the process of copying to application table 214b, then database 212b of target database system 204 would be ready for production use. However, this is not normally the case—requests will continue to come in to source database system 202, which will cause application table 214a to be modified. However, those changes are logged to logging table 220 by the trigger 215a.

One skilled in the relevant art will further recognize that, since these changes will continue to occur in a production system, the only way to propagate those remaining changes logged in logging table 220 to application table 214b in existing systems would be to take source database system 202 offline, finish propagating the changes to application table 214b, and then bring target database system 204 online as the new production system. However, given the desire to minimize or eliminate downtime, this approach is not practical.

Instead, this approach allows for servicing of requests by either source database system 202 or target database system 204 throughout the migration process, while ensuring that the correct data from either application table 214a or 214b is modified or served in response to a query.

Next, a replacement view is created on the application table, shown as replacement view 216. This replacement view 216 combined application table 214b with a remote delta 218 in order to provide a current and correct view of the application table, whether the current and correct data is stored at application table 214a at source database system 202 or at application table 214b at target database system 204. Replacement view 216 may be created, in accordance with a non-limiting exemplary embodiment, using the following code:

```
CREATE VIEW A AS
   SELECT * FROM A_Remote
   WHERE K1 IN (SELECT K1 FROM A_Log_Remote WHERE
   Status = 0)
UNION
   SELECT * FROM A~
   WHERE K1 NOT IN (SELECT K1 FROM A_Log_Remote
   WHERE Status = 0);
```

One skilled in the relevant arts will appreciate that using this exact code is not required, and other approaches that accomplish the same blending of the data stored in application table 214b and a remote delta 218 of application table 214a may be used. More generically, the logic is:

```
CREATE VIEW ...
   /* READ REMOTE DELTA, NOT YET TRANSFERRED TO
   TARGET */
UNION
   /* READ LOCAL DATA NOT READ REMOTELY */;
```

The foregoing exemplary approach treats the contents of A_Remote (e.g., application table 214a) together with A_Log_Remote (e.g., logging table 220) as the current and correct version—and this will be true regardless of whether a query is received and processed via source database system 202 or target database system 204. This continues until step 116 of FIG. 1, once the target database system 104 of FIG. 1 or 204 of FIG. 2 is ready for production, where the roles swap and the contents of A~(e.g., application table 214b) are treated as the current and correct version.

In this example code, replacement view 216 (designated as a view "A") is the union of the contents of the "A_Remote" table (corresponding to application table 214a) and of the "A~" table (corresponding to application table 214b) depending on whether a particular change to a table row at key value K1 is found in A_Log_Remote (corresponding to logging table 220) and has not been replayed to application table 214b (indicated by a status of "0" in the log).

Additionally, if a write operation is attempted on replacement view 216, a trigger 215b is used to immediately update the contents of application table 214b. Continuing with the above example, this trigger 215b ensures that if a write is made directly to view "A" then the contents of the "A~" table (corresponding to application table 214b) are updated with the change.

This replacement view ensures that a query may be made on target database system 204 and will provide the same result as if it were made on source database system 202, whether or not all changes have been propagated to application table 214b from application table 214a.

Figure 3:
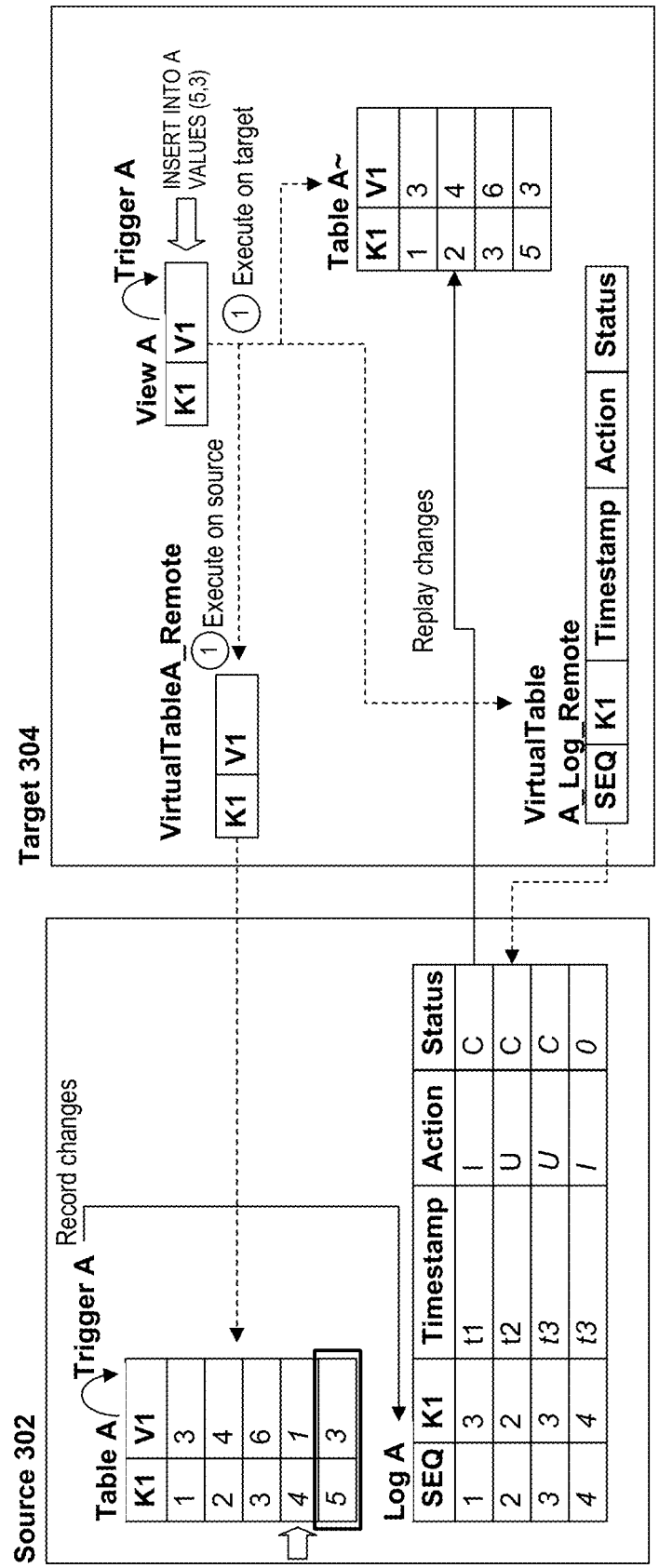
FIG. 3 is a database system diagram, in accordance with an embodiment.

The particulars of this configuration embodiment are illustrated in an example update operation performed on the source database system 202. FIG. 3 is a database system diagram 300, in accordance with an embodiment. Database system diagram 300 shows source database system 302 and target database system 304 configured in the manner shown in FIG. 2 and with the exemplary replacement view 216 as above.

FIG. 3 shows a few different example operations that can occur, in accordance with embodiments. For example, a write (insert query, in this case) is made at source database system 302, and demonstrates how this change is made visible to a read (e.g., a select query) at target database system 304 through the replacement view 216 of FIG. 2.

As shown in Table A of source database system 302, a K1,V1 pair 4,1 is inserted in Table A (corresponding to Application Table 214a of FIG. 2). Trigger A (corresponding to trigger 215a of FIG. 2) causes this insertion to be logged in Log A (corresponding to Logging Table 220 of FIG. 2). In this example, the previous insertions/updates of rows corresponding to K1=3, 2, and 3 are marked with a status of 'C', showing that these changes have been replayed to target database system 304 (specifically, at corresponding table Table A~ (corresponding to Application Table 214b of FIG. 2), the values for K1=2 and 3 correspond to the most recent values of K1=2 and 3 in Table A).

However, the insertion of K1,V1=4,1 (seq=4 in Log A) is marked with a status of "0", indicating that this insertion has not yet been replayed to Table of target database system 304. By way of non-limiting example, target database system 304 ensures consistent writes of replayed data, which guarantees that non-replayed items from Log A are transferred from source Table A to target Table A~.

Separately, FIG. 3 shows an additional example operation the insertion of K1,V1=5,3 directly at target database system 304. A trigger, Trigger A (corresponding to trigger 215b of FIG. 2) of view A (corresponding to Replacement View 216 of FIG. 2), is defined that ensures that changes made on view A are actually propagated to the underlying Table A~ of target database system 304, as well as to remote Table A of source database system 302.

A request made on target database system 304 does not need to specify whether to read the contents of Table A of source database system 302 or Table A~ of target database system 304; the query is simply performed on View A, in accordance with the code segment shown above—View A becomes the stand-in for all queries on "A". Later, once target database system 304 becomes the production system, Table A~ is renamed to Table A, and View A deleted, allowing the same queries to be processed directly against the new Table A.

Based on the foregoing example, the following section of the View A definition:

SELECT * FROM A_Remote

WHERE K1 IN (SELECT K1 FROM
    A_Log_Remote WHERE Status=0)

causes View A to include any rows from A_Remote (the original table, such as application table 214a in source database system 202 of FIG. 2) that have not been committed to A~. In this case, the newly-inserted K1,V1=4,1 is marked in Log A with status=0, indicating that it has not been committed (the other actions have been committed, as indicated with status=C, and are not included in the result). This result is then UNIONed with any contents of table A~ that are not superseded by the contents of Log A, given by the following section of the View A definition:

SELECT * FROM A~

WHERE K1 NOT IN (SELECT K1 FROM
    A_Log_Remote WHERE Status=0);

This virtual table (view) allows correct queries to both K1=4 (retrieved from remote table A) and K1=5 (retrieved from table A~). Since requests to target database system 304 will only reach out to remote table A_Remote (e.g., target database system 204 reaching out to remote application table 214a of FIG. 2) for rows that are not up to date in the local table (e.g., table A~, or application table 214b of FIG. 2), the amount of communication between target database system 204 and source database system 202 is minimized. This reduces the performance impact of accessing target database system 204 while migration is still underway.

Additionally, because the same data can be accessed via database 212a of source database system 202 and database 212b of target database system 204 throughout migration without fault, there is no need to disable access to system 200 at any point. By way of non-limiting example, at the application level (e.g., applications 206a and 206b), load balancers 208a and 208b can communicate to transition requests during migration from source database system 202 to target database system 204. In particular, when target database system 204 is ready to handle requests, load balancer 208a may redirect requests to load balancer 208b. And enqueue server 210a and enqueue server 210b ensure that locks on the database taken by either application 206a or 206b are honored by the other application, in accordance with an embodiment.

Figure 4:
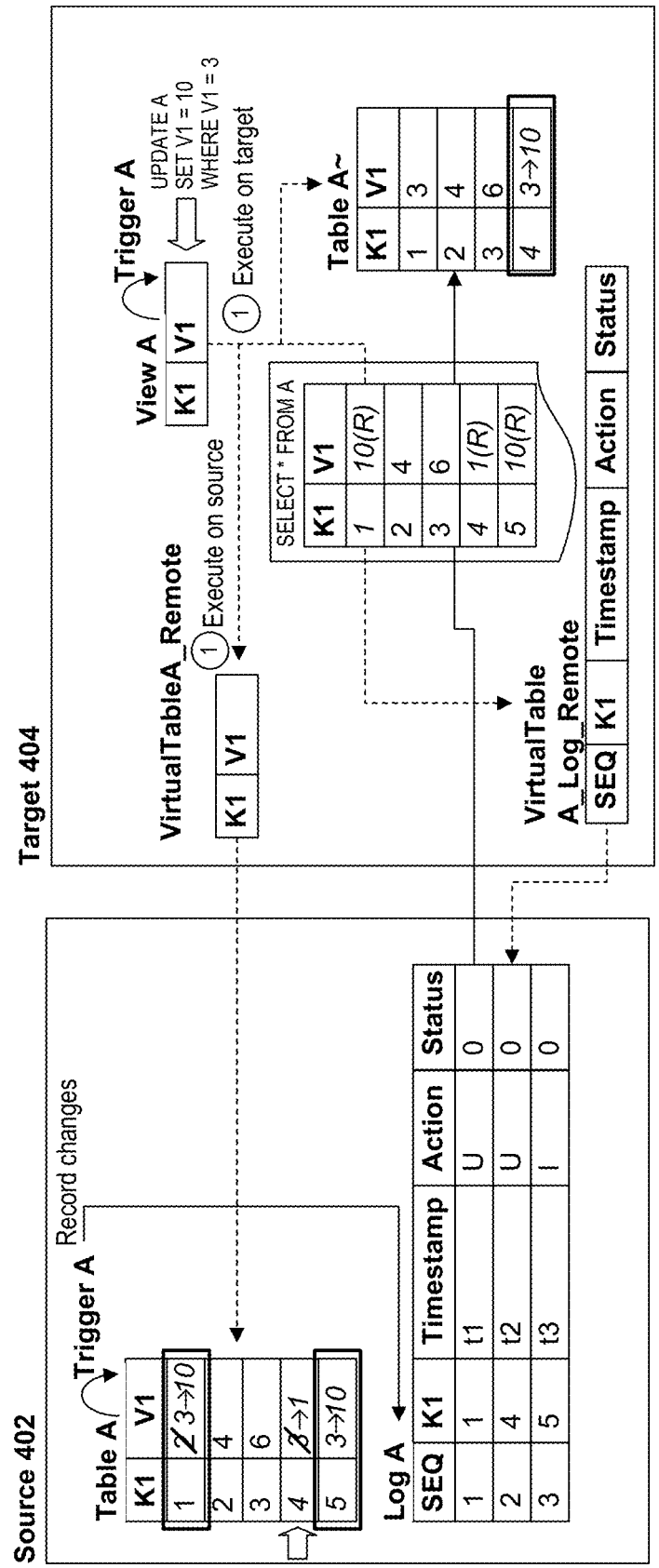
FIG. 4 is a database system diagram, in accordance with an embodiment.

FIG. 4 is a database system diagram 400, in accordance with an embodiment. Database system diagram 400 shows source database system 402 and target database system 404 configured in the manner shown in FIG. 2 and with the exemplary replacement view 216 as above.

In the example of FIG. 4, an update query is performed at target database system 404. In this non-limiting example, the update query performed is:

UPDATE A SET V1=10 WHERE V1=3;

This query is performed on View A, which means it is performed on both Table A~ and Table A. On Table A~, this query will update K1,V1=4,3 to 4,10. On Table A, it will update K1,V1=1,3 to 1,10 and 5,3 to 5,10. However, K1=4 in Table A has V1=1, so the update will not be performed on this row.

In order to perform a query on View A, one approach is to create a set of "instead of" triggers that perform the operations described above. For example, the aforementioned UPDATE query performed on View A causes an "instead of" trigger that performs the correct updates to Table A and Table A~, in accordance with an embodiment. One skilled in the relevant arts will appreciate that any mechanism that relates queries on the view to the underlying tables may be used, and the "instead of" trigger approach is provided by way of example, and not limitation.

As a result, row K1=4 is inconsistent in Table A and Table A~, because the previous update to Table A (see seq 2 of Log A) is not yet committed to Table A~. The contents of Table A are correct in this case, though, and will be provided by the aforementioned mechanisms regardless of where a query for K1=4 is made. Specifically, if a query:

SELECT * FROM A WHERE K1=4;

is received at source database system 402, the response will come directly from Table A with the answer 4,1. If the same query is received at target database system 404, it is performed on View A in accordance with the aforementioned exemplary code for replacement view 216 of FIG. 2. Based on the foregoing example:

SELECT * FROM A_Remote

WHERE K1 IN (SELECT K1 FROM
    A_Log_Remote WHERE Status=0)

results in View A having the value from Table A (A_Remote) because the update to K1=4 is still pending and uncommitted (status=0, see seq=2) in Log A (A_Log_Remote). One skilled in the relevant arts will recognize that eventually Table A~ will be overwritten with the correct data from Table A, once the update to K1=4 is committed. The resulting view is shown in FIG. 4 in the table labeled "select * from A", which shows the current values from Table A~ (local to target database system 404), and the remote values (designated with an (R) identifier) that are read from Table A at source database system 402.

At any point where all of the changes reflected in logging table 220 are committed to application table 214b, target database system 204 is fully migrated—as long as no further changes are made to database 212a, database 212b may become the sole database for production. All of the artifacts of migration, such as replacement view 216, may be dropped in favor of direct queries to application table 214b—such as by, for example, renaming Table to Table A~ in conjunction with dropping View A.

Figure 5:
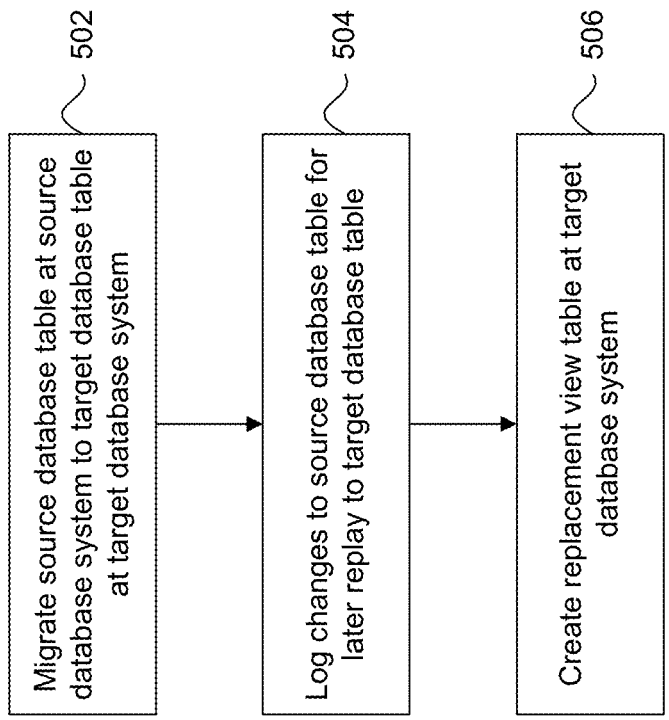
FIG. 5 is a flowchart illustrating steps for initiating replication, in accordance with an embodiment.

FIG. 5 is a flowchart 500 illustrating exemplary steps for initiating replication, in accordance with an embodiment. Flowchart 500 is described with continued reference to database replication system 200 of FIG. 2 in accordance with an embodiment. At step 502, the contents and structure of application table 214a of source database system 202 are migrated to application table 214b of target database system 204. By way of non-limiting example, logging table 220 and trigger 215a are created before this initial migration, so that any changes that occur during (and after) the migration are captured for eventual replay to application table 214b.

However, in the interim, changes will be made to application table 214a, so these are captured in a logging table 220 at step 504, for later replication to application table 214b of target database system 204. By way of non-limiting example, steps 502 and 504 are performed in parallel to each other.

And at step 506, a replacement view table, such as replacement view table 216, is created at the target database system 204 to allow access to the more recent and correct contents of application tables 214a and 214b from target database system 204. By way of non-limiting example, creating the replacement view table 216 at target database system 204 requires renaming application table 214b to a temporary name (e.g., renaming Table A to Table A~), and naming the replacement view table 216 based on the original name of application table 214b. This will allow queries made to Table A to be performed either on an actual Table A (e.g., Table A~ once it becomes the production table and is renamed to Table A), or on View A, without needing to change the queries.

Figure 6:
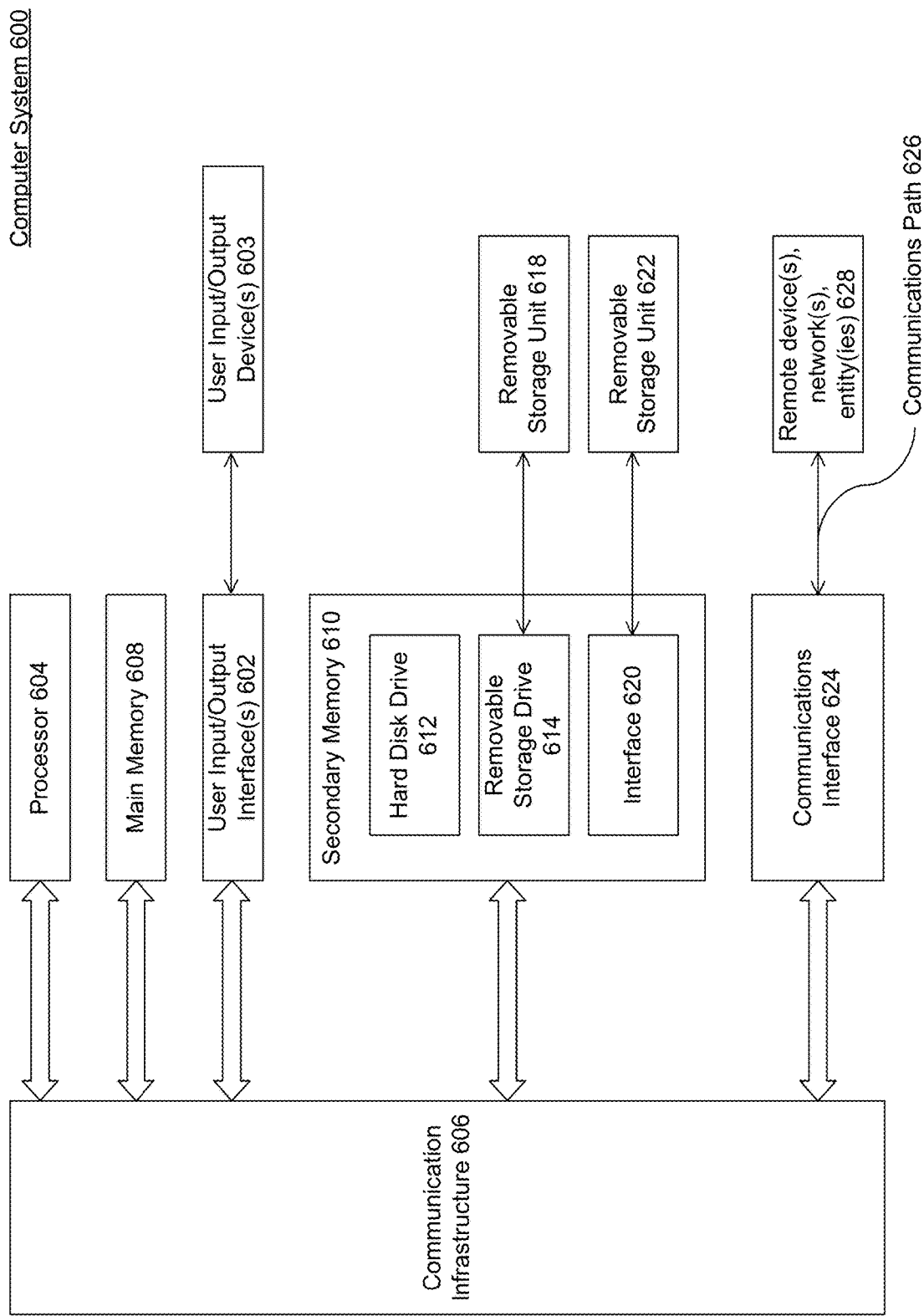
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   migrating, by one or more computing devices, a source database table at a source database system to a target database table at a target database system;
   configuring, by the one or more computing devices, the source database system to log changes to the source database table to a log concurrent with the migrating, wherein the log is configured to replay the changes to the target database table upon conclusion of the migrating; and
   creating, by the one or more computing devices, a replacement view table at the target database system, wherein the replacement view table provides access to current data from the source database table and the target database table concurrent with the migrating.

2. The method of claim 1, wherein creating the replacement view comprises:
   connecting, by the one or more computing devices, the target database system to the source database table and the log; and
   creating, by the one or more computing devices, a view comprising:
      rows from the source database table where the log indicates that the rows from the source database table have not been replayed to the target database table, unioned with
      rows from the target database table where the log does not indicate that the rows from the target database table correspond to rows from the source database table have not been replayed to the target database table.

3. The method of claim 1, further comprising:
   receiving, by the one or more computing devices, a query at the source database system; and
   performing, by the one or more computing devices, the query against the source database table to produce a response to the query.

4. The method of claim 1, further comprising:
   receiving, by the one or more computing devices, a query at the target database system; and
   performing, by the one or more computing devices, the query against the replacement view table to produce a response to the query.

5. The method of claim 4, wherein performing the query against the replacement view table comprises:
   configuring, by the one or more computing devices, a trigger to perform the query against the source database table and the target database table.

6. The method of claim 1, further comprising:
   locking, by the one or more computing devices, at least a corresponding portion of the source database table and the target database table in response to a request for a lock by an application.

7. The method of claim 1, further comprising:
   transitioning, by the one or more computing devices, a request from an application on the source database system to an application on the target database system.

8. A system, comprising:
   a memory configured to store operations; and
   one or more processors configured to perform the operations, the operations comprising:
      migrating a source database table at a source database system to a target database table at a target database system,
      configuring the source database system to log changes to the source database table to a log concurrent with the migrating, wherein the log is configured to replay the changes to the target database table upon conclusion of the migrating, and
      creating a replacement view table at the target database system, wherein the replacement view table provides access to current data from the source database table and the target database table concurrent with the migrating.

9. The system of claim 8, wherein creating the replacement view comprises:
   connecting the target database system to the source database table and the log; and
   creating a view comprising:
      rows from the source database table where the log indicates that the rows from the source database table have not been replayed to the target database table, unioned with
      rows from the target database table where the log does not indicate that the rows from the target database table correspond to rows from the source database table have not been replayed to the target database table.

10. The system of claim 8, the operations further comprising:
   receiving a query at the source database system; and
   performing the query against the source database table to produce a response to the query.

11. The system of claim 8, the operations further comprising:
   receiving a query at the target database system; and
   performing the query against the replacement view table to produce a response to the query.

12. The system of claim 11, wherein performing the query against the replacement view table comprises:
   configuring a trigger to perform the query against the source database table and the target database table.

13. The system of claim 8, the operations further comprising:
   locking at least a corresponding portion of the source database table and the target database table in response to a request for a lock by an application.

14. The system of claim 8, further comprising:
   transitioning a request from an application on the source database system to an application on the target database system.

15. A computer readable storage device having instructions stored thereon execution of which, by one or more processing devices, causes the one or more processing devices to perform operations comprising:
   migrating a source database table at a source database system to a target database table at a target database system;
   configuring the source database system to log changes to the source database table to a log concurrent with the migrating, wherein the log is configured to replay the changes to the target database table upon conclusion of the migrating; and
   creating a replacement view table at the target database system, wherein the replacement view table provides access to current data from the source database table and the target database table concurrent with the migrating.

16. The computer readable storage device of claim 15, wherein creating the replacement view comprises:
   connecting the target database system to the source database table and the log; and
   creating a view comprising:
      rows from the source database table where the log indicates that the rows from the source database table have not been replayed to the target database table, unioned with
      rows from the target database table where the log does not indicate that the rows from the target database table correspond to rows from the source database table have not been replayed to the target database table.

17. The computer readable storage device of claim 15, the operations further comprising:
   receiving a query at the source database system; and
   performing the query against the source database table to produce a response to the query.

18. The computer readable storage device of claim 15, the operations further comprising:
   receiving a query at the target database system; and
   performing the query against the replacement view table to produce a response to the query.

19. The computer readable storage device of claim 18, wherein performing the query against the replacement view table comprises:
   configuring a trigger to perform the query against the source database table and the target database table.

20. The computer readable storage device of claim 15, the operations further comprising:
   locking at least a corresponding portion of the source database table and the target database table in response to a request for a lock by an application.

* * * * *